US012416984B2

(12) United States Patent
Dekel et al.

(10) Patent No.: US 12,416,984 B2
(45) Date of Patent: Sep. 16, 2025

(54) TOUCH-SENSITIVE INPUT DEVICE WITH HAPTIC FEEDBACK MECHANISM

(71) Applicant: Microsoft Technology Licensing, LLC, Redmond, WA (US)

(72) Inventors: Shoham Dekel, Tel Aviv (IL); Assaf Bar-Ness, Ness Zionna (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/554,038

(22) PCT Filed: Mar. 25, 2022

(86) PCT No.: PCT/US2022/071343
§ 371 (c)(1),
(2) Date: Oct. 5, 2023

(87) PCT Pub. No.: WO2022/221809
PCT Pub. Date: Oct. 20, 2022

(65) Prior Publication Data
US 2024/0126385 A1 Apr. 18, 2024

(30) Foreign Application Priority Data
Apr. 14, 2021 (NL) .................................. 2027963

(51) Int. Cl.
*G06F 3/038* (2013.01)
*G06F 3/01* (2006.01)
*G06F 3/0354* (2013.01)

(52) U.S. Cl.
CPC ............ *G06F 3/0383* (2013.01); *G06F 3/016* (2013.01); *G06F 3/03545* (2013.01)

(58) Field of Classification Search
CPC ..... G06F 3/0383; G06F 3/016; G06F 3/03545
See application file for complete search history.

(56) References Cited

U.S. PATENT DOCUMENTS

| 7,982,711 B2 | 7/2011 | Anastas et al. |
| 8,937,603 B2 | 1/2015 | Flanagan et al. |
| 9,116,560 B1 | 8/2015 | Habash |
| 10,120,446 B2 | 11/2018 | Pance et al. |
| 10,133,370 B2 | 11/2018 | Evreinov et al. |
| 10,503,287 B2 | 12/2019 | Wang |

(Continued)

FOREIGN PATENT DOCUMENTS

| EP | 2784630 A1 | 10/2014 |
| EP | 3168713 A1 | 5/2017 |

(Continued)

OTHER PUBLICATIONS

"Search Report and Written Opinion Issued in Netherlands Patent Application No. N2027963", Mailed Date: Feb. 8, 2022, 10 Pages.

(Continued)

*Primary Examiner* — Afroza Chowdhury
(74) *Attorney, Agent, or Firm* — Alleman Hall & Tuttle LLP

(57) ABSTRACT

Examples are disclosed that relate to applying haptic output to a touch-sensitive input device. One example provides a touch-sensitive input device comprising a body, a haptic feedback mechanism within the body, a sensor subsystem, a logic processor, and a memory. The memory stores instructions executable by the processor to receive from the sensor subsystem sensor data indicating locations along the body of a plurality of contact points between a user hand and the body, based at least in part on the sensor data, determine a touch profile of the user hand applied to the body, based at least in part on the touch profile of the user hand, determine a selected haptic output to be applied to the body, and cause a drive signal to be transmitted to the haptic feedback mechanism to apply the selected haptic output to the body.

20 Claims, 9 Drawing Sheets

(56) References Cited

U.S. PATENT DOCUMENTS

| | | | |
|---|---|---|---|
| 10,564,724 | B1 | 2/2020 | Bergeron et al. |
| 2014/0282051 | A1* | 9/2014 | Cruz-Hernandez ..... G06F 1/169 |
| | | | 715/744 |
| 2014/0340326 | A1* | 11/2014 | Kameyama ......... G06F 3/03545 |
| | | | 345/173 |
| 2015/0363035 | A1* | 12/2015 | Hinckley ............ G06F 3/04883 |
| | | | 345/173 |
| 2017/0285774 | A1 | 10/2017 | Parikh et al. |
| 2017/0300170 | A1* | 10/2017 | Hinckley ............ G06F 3/03545 |
| 2019/0113986 | A1 | 4/2019 | Bikumala et al. |
| 2020/0026354 | A1 | 1/2020 | Swindells |
| 2020/0201501 | A1 | 6/2020 | Rho et al. |
| 2020/0363880 | A1* | 11/2020 | Bogan ................. G06F 3/03545 |

FOREIGN PATENT DOCUMENTS

| | | |
|---|---|---|
| WO | 2015191409 A1 | 12/2015 |
| WO | 2020231549 A1 | 11/2020 |

OTHER PUBLICATIONS

Owen, Malcolm, "Apple Pencil Could Gain Haptic System that Could Monitor a User's Grip", Retrieved from: https://appleinsider.com/articles/20/02/18/apple-pencil-could-gain-haptic-system-that-could-monitor-a-users-grip, Feb. 18, 2020, 13 Pages.

"International Search Report and Written Opinion Issued in PCT Application No. PCT/US22/071343", Mailed Date: Jun. 10, 2022, 14 Pages.

Puerto, et al., "Influence of User Grasping Position on Haptic Rendering", In IEEE/ASME Transactions on Mechatronics, vol. 17, Issue 1, Feb. 1, 2012, pp. 174-182.

Communication under Rule 71(3) EPC, Received in European Patent Application No. 22715961.3, mailed on Jul. 29, 2025, 08 pages.

* cited by examiner ized positioning of the motor, however, may be such that users perceive noticeably different

TOUCH-SENSITIVE INPUT DEVICE WITH HAPTIC FEEDBACK MECHANISM

CROSS REFERENCE TO RELATED APPLICATIONS

The present application is a U.S. National Phase of International Patent Application Serial No. PCT/US2022/071343 entitled "TOUCH-SENSITIVE INPUT DEVICE", filed Mar. 25, 2022, which claims priority to Netherlands Patent Application Serial No. 2027963, filed Apr. 14, 2021, the entire contents of each of which are hereby incorporated by reference for all purposes.

BACKGROUND

A variety of input devices have been developed that provide haptic output. As one example, a stylus may provide haptic output in the form of vibration applied to a body of the stylus via an internal motor.

SUMMARY

Examples are disclosed that relate to applying haptic output to a touch-sensitive input device. One example provides a touch-sensitive input device comprising a body, a haptic feedback mechanism within the body, a sensor subsystem, a logic processor, and a memory. The memory stores instructions executable by the processor to receive from the sensor subsystem sensor data indicating locations along the body of a plurality of contact points between a user hand and the body, based at least in part on the sensor data, determine a touch profile of the user hand applied to the body, based at least in part on the touch profile of the user hand, determine a selected haptic output to be applied to the body, and cause a drive signal to be transmitted to the haptic feedback mechanism to apply the selected haptic output to the body.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
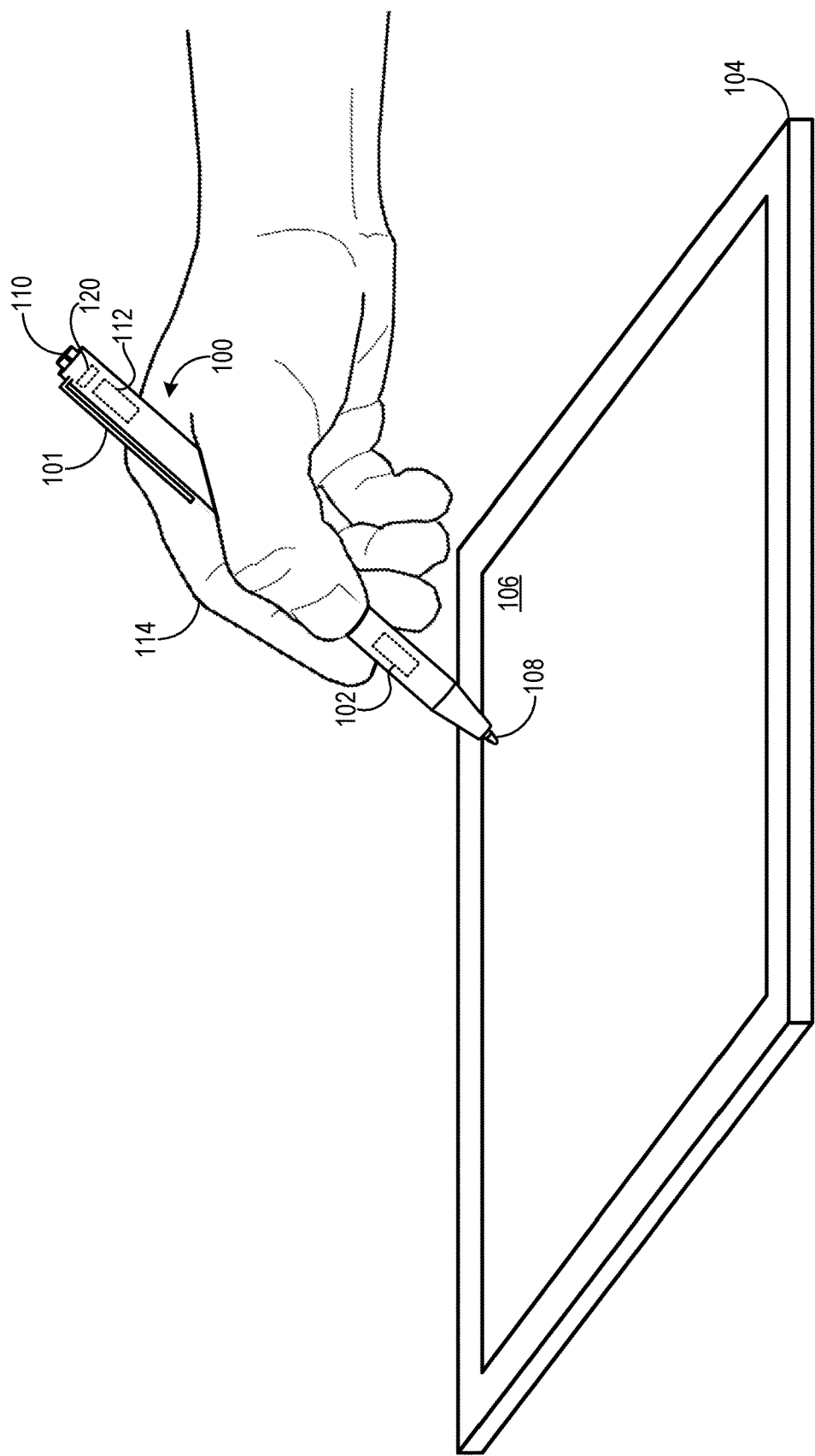
FIG. 1 depicts an example touch-sensitive input device in the form of a stylus.

A variety of input devices have been developed that provide haptic output. As one example, a stylus may provide haptic output in the form of vibration applied to a body of the stylus via an internal motor. Other examples of input devices that may provide haptic feedback include game controllers and smartphones. These and other input devices may provide haptic output for a variety of purposes, including but not limited to simulating a tactile sensation (e.g., resulting from the traversal of a virtual surface such as gravel, or from touching a virtual object), simulating a force, confirming a user input (e.g., in response to user selection of a graphical user interface element), or providing another type of feedback (e.g., an indication of the state of an input device such as a battery level, the state of an application).

Some handheld or hand-operated input devices are manipulated—by design and/or in practice—in different manners, such as with different hand grips, finger positions, and grip strengths. This variance in the manipulation of an input device may pose challenges in attempting to provide a desired haptic experience when using the input device. A stylus provider, for example, may desire a consistent haptic output across the body of a stylus. To achieve haptic output, a haptic feedback mechanism such as a motor may be arranged within the body of the stylus, such as near the tip of the stylus. This localhaptic outputs as their grip and finger positions on the stylus change, which tends to occur in typical stylus use scenarios. For example, a typical stylus user may draw using an initial grip but flip the stylus and apply a different grip to erase, or may concentrate finger positioning when finely drawing but loosen finger positioning when coarsely shading. In some examples, even relatively small variations (e.g., 1-2 cm) in the positions where a user's fingers contact a stylus may produce noticeable variation in how the same haptic output is perceived.

Accordingly, examples are disclosed that relate to a touch-sensitive input device configured to determine haptic outputs to be applied to the body of the input device based on sensed contact between a user hand and the input device body. As described below, the touch-sensitive input device may utilize a sensor subsystem to identify the locations of contact points between a user hand and the input device body, and determine a touch profile of the user hand applied to the body. The touch profile may assume various forms but generally encodes spatial relationships between the user hand and input device body, such as the spatial distribution of the contact points over the body and/or the surface area of the contact points.

Based on the touch profile, the input device may determine a selected haptic output to be applied to the body and cause a drive signal to be transmitted to a haptic feedback mechanism to thereby apply the selected haptic output to the body. Further, in some examples where a consistent haptic output is desired, the input device may determine that the user hand has applied a different touch profile and cause a different drive signal to be transmitted to the haptic feedback mechanism to thereby apply the same haptic output to the body that was applied for the previous touch profile. As such, in some examples, a substantially consistent haptic output may be achieved along the input device body for different hand grips and finger positions. In other examples, different haptic outputs may be applied to the body for different touch profiles, and potentially for different user activities performed using the input device.

FIG. 1 depicts an example touch-sensitive input device in the form of a stylus 100. Stylus 100 includes an elongated body 101 in the form factor of a pen, though the body may assume any suitable form. As shown in the depicted example, stylus 100 is operable to provide user input to a computing device 104. Computing device 104 is shown in the form of a mobile computing device (e.g., tablet) but may assume any suitable form. Any suitable type of user input may be provided to computing device 104 using stylus 100. As examples, stylus 100 may be used to draw graphical content on a touch-sensitive display 106 of computing device 104, modify graphical content (e.g., resize, reposition, rotate), erase graphical content, select graphical user interface (GUI) elements, and/or provide gestural input.

To enable the provision of user input from stylus 100 to computing device 104, the stylus may include a communication subsystem with which data may be transmitted from the stylus to the computing device. For example, the communication subsystem may include a radio transmitter for wirelessly transmitting data to computing device 104 along a radio link. As another example, the communication subsystem alternatively or additionally may include a capacitive transmitter for wirelessly transmitting data to computing device 104 along a capacitive link. The capacitive link may be established between the capacitive transmitter and a touch-sensitive display 106 having a capacitive touch sensor, for example.

Any suitable data may be transmitted to computing device 104 via the communication subsystem, including but not limited to indications of actuation at stylus 100 (e.g., depression of a depressible tip 108 or a depressible end 110), data regarding the position of the stylus relative to the computing device (e.g., one or more coordinates), a power state or battery level of the stylus, and data from a motion sensor on-board the stylus (e.g., accelerometer data with which stylus gestures may be identified). Moreover, in some examples, data regarding the locations of contact points between a user hand and stylus 100, which may be sensed by the stylus as described below, may be transmitted to computing device 104 via the communication subsystem. It will be understood that any suitable mechanism may be used to transmit information from stylus 100 to computing device 104. Additional examples include optical, resistive, and wired mechanisms. Further, in some examples, the communication subsystem may be configured to receive data from computing device 104 as well as transmit data to the computing device. Example hardware including a processor and communication subsystem that may be incorporated by stylus 100 to implement the disclosed approaches is described below with reference to FIG. 9.

Stylus 100 is configured to provide haptic feedback to users. To this end, stylus 100 includes a haptic feedback mechanism 102 configured to apply haptic output to body 101. As shown in FIG. 1, haptic feedback mechanism 102 is arranged within body 101 toward tip 108, but may be provided at any suitable location at stylus 100. Haptic feedback mechanism 102 may employ any suitable component(s) to provide haptic feedback as described herein. As one example, haptic feedback mechanism 102 may include a motor that applies haptic output to body 101 in the form of vibration induced in the body. In some examples, multiple haptic feedback mechanisms are provided at different locations within a stylus.

Stylus 100 further includes a sensor subsystem schematically depicted at 112. Sensor subsystem 112 is configured to output sensor data indicating locations along body 101 of the contact points formed between a user hand 114 and the body as detected by multiple sensing elements (not shown). As described below, this sensor data may be used to determine a selected haptic output to be applied to body 101. By providing haptic output based on the actual contact between user hand 114 and stylus 100, in some examples a substantially and perceptually consistent haptic output is provided across body 101 for different hand grips and finger positions. In other examples, the sensed contact between user hand 114 and stylus 100 drives the provision of different haptic outputs for different hand grips, finger positions, and/or user activities, as described in further detail below. Detail regarding example implementations of sensor subsystem 112 and sensing elements are described below with reference to FIGS. 7A-7B.

Stylus 100 is configured to determine a touch profile based on the sensor data indicating the locations along body 101 of the contact points between user hand 114 and the body. As used herein, "touch profile" refers to a data structure encoding spatial relationship(s) between an input device and a hand in contact with the input device. For user hand 114 and the grip applied by the hand to stylus 100 depicted in FIG. 1, stylus 100 determines a touch profile based on the sensor data produced by sensor subsystem 112 indicating the locations of the contact points between user hand 114 and body 101. In the depicted example, these contact point locations are distributed axially along and circumferentially around body 101. Stylus 100 then determines and applies a selected haptic output to body 101 based on this touch profile. As described below, in some examples stylus 100 may store one or more predetermined touch profiles and may determine a particular touch profile of the predetermined touch profiles based on sensor data indicating contact point locations by mapping the sensor data to the particular predetermined touch profile that most closely corresponds to the sensor data.

Figure 2:
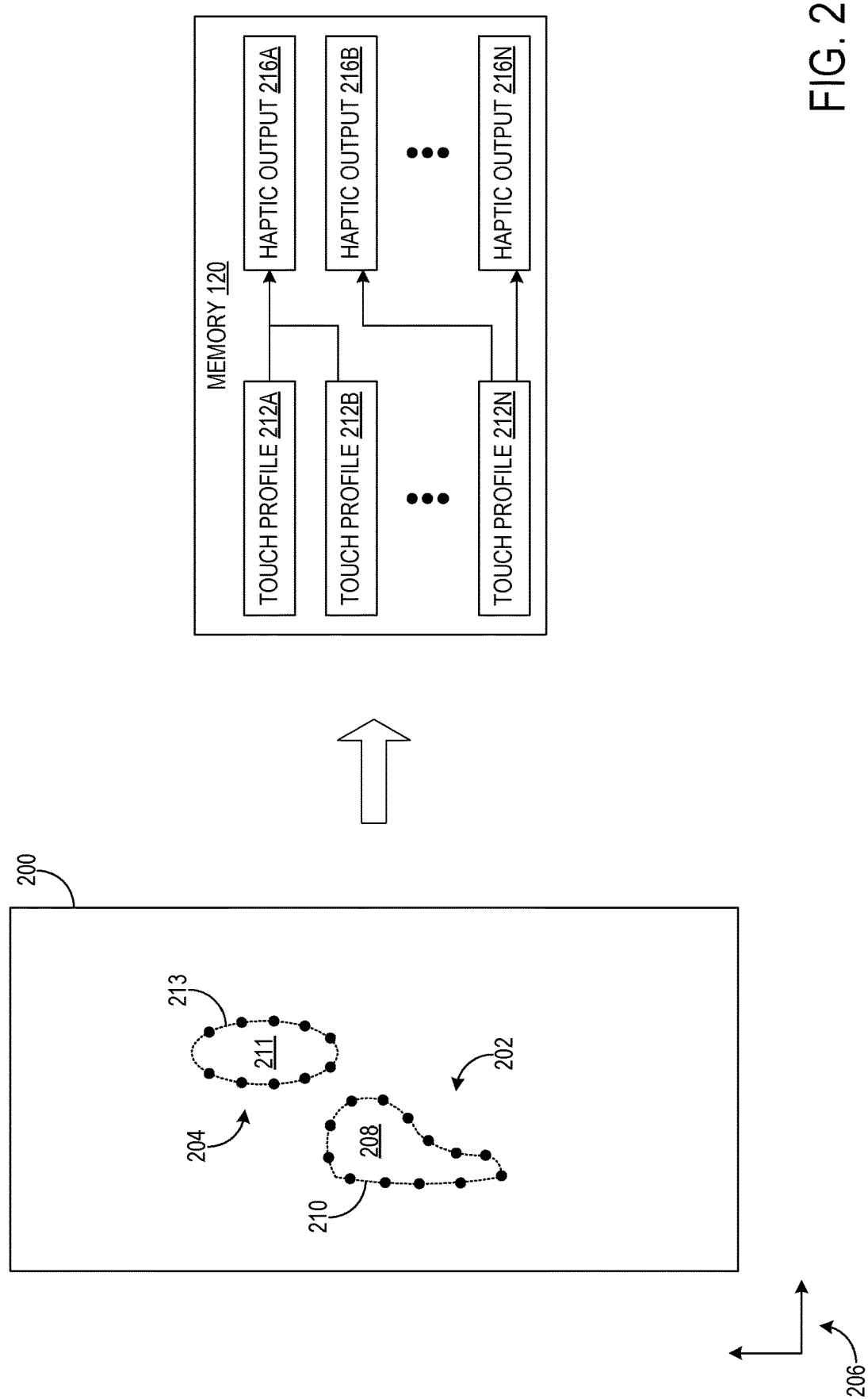
FIG. 2 depicts an example representation of sensor data produced the stylus of FIG. 1.

FIG. 2 depicts an example representation 200 of the sensor data produced by sensor subsystem 112 indicating the locations of the contact points between user hand 114 and body 101. Representation 200 thus illustrates the contact points—as sensed by sensor subsystem 112—produced by the grip applied by user hand 114 depicted in FIG. 1 to body 101.

As illustrated in representation 200, the sensor data indicates the respective locations of a first plurality of contact points 202, which correspond to a first contact patch resulting from the contact between the thumb of user hand 114 and body 101. The sensor data also indicates the respective locations of a second plurality of contact points 204, which correspond to a second contact patch resulting from the contact between the index finger of user hand 114 and body 101.

In representation 200, contact point locations are encoded in a two-dimensional coordinate system indicated at 206. In coordinate system 206, the vertical axis is aligned with the axial extent of body 101, and the horizontal axis represents at least a portion of the circumference of the body. Thus, the area spanned by representation 200 substantially corresponds to a surface area of the exterior surface of body 101. In some examples, contact by user hands may be detectable by stylus 100 across the substantial entirety of the exterior surface of body 101. In other examples, contact may be detectable at a portion, and not the entirety, of the exterior surface of body 101, in which case the area spanned by representation 200 may correspond to the portion where contact is detectable. Contact point locations may be encoded in any suitable manner. As additional examples, contact point locations may be encoded in polar, cylindrical, and spherical coordinate systems, and/or as points in a point cloud or mesh.

In some examples, stylus 100 may use the sensor data produced by sensor subsystem 112 indicating the locations of contact points along body 101 to determine the surface area of the contact points. In the example depicted in FIG. 2, a surface area 208 of the first plurality of contact points 202 is determined as the area bounded by a perimeter 210 of the first plurality of contact points, and a surface area 211 of the second plurality of contact points 204 is determined as the area bounded by a perimeter 213 of the second plurality of contact points. Thus, in some examples, stylus 100 may determine the surface area of a discrete contact patch—itself a two-dimensional area in representation 200—formed by a plurality of contact points. Stylus 100 may determine the surface area of contact points in any suitable manner. As one example, stylus 100 may form a perimeter of a contact patch (e.g., by connecting the contact points that comprise the patch) and compute the surface area bounded by the perimeter. As another example, stylus 100 may determine a shape that bounds a set of contact points and compute the area of the shape.

As noted above, stylus 100 may determine a touch profile based at least in part on sensor data indicating contact point locations along body 101 and select a haptic output to be applied to the body based on the touch profile. FIG. 2 illustrates one example method of determining a touch profile based on the sensor data depicted in representation 200. In this example, the touch profile is determined at least in part by mapping the sensor data to a predetermined touch profile among a plurality of predetermined touch profiles 212 stored at a memory 120, which may be implemented at stylus 100. A touch profile 212B is selected among the plurality of predetermined touch profiles 212 as it is determined to be the touch profile that most closely corresponds to the sensor data illustrated by representation 200.

The use of predetermined touch profiles 212 may facilitate a mechanism of selecting haptic outputs at reduced computational expense as compared to approaches in which touch profiles are dynamically determined. Further, the selection of which predetermined touch profiles 212 are made available to stylus 100 may at least in part enable control over the variety of hand grips and contact point distributions for which haptic outputs are provided, and the degree to which different hand grips and contact point distributions are mapped to the same touch profile. Moreover, predetermined touch profiles 212 may be selected to represent substantially the entire gamut of hand grips and contact point distributions that are applied to stylus 100 during operation. In some examples, this type of comprehensive representation of user contact with stylus 100 may be achieved through a relatively small number of predetermined touch profiles 212 that collectively consume a low amount of memory.

The correspondence between sensor data and touch profiles may be evaluated in any suitable manner. For example, the locations of one or more contact points, and in some examples the locations of all contact points indicated in the sensor data, may be compared to corresponding contact point locations identified by a predetermined touch profile 212. In some examples, the contact point locations associated with each discrete contact patch may be compared to contact point locations of a corresponding discrete contact patch identified by a predetermined touch profile 212. Further, the surface area of one or more contact points may be compared to corresponding surface area(s) identified by a predetermined touch profile 212. For example, the surface area of each discrete contact patch may be compared to the surface area of a corresponding discrete contact patch identified by a predetermined touch profile 212. Alternatively or additionally, the total surface area formed by all contact points or contact patches may be compared to the total surface area identified by a predetermined touch profile 212.

Stylus 100 may utilize a threshold similarity condition in mapping sensor data to a predetermined touch profile 212. In such examples, touch profiles 212 that do not satisfy the threshold similarity condition may be omitted from selection, while touch profiles 212 that do satisfy the threshold similarity condition may be considered for selection. The threshold similarity condition may be defined in any suitable manner. As examples, the threshold similarity condition may evaluate the correspondence between contact point locations in terms of position and/or spread, the correspondence between the number of contact points and/or contact patches, the correspondence between contact patch perimeters or geometry, and/or the correspondence between surface areas (e.g., in terms of percentage, ratio). Further, in some examples, the threshold similarity condition may be adjustable. For example, stylus 100 may adjust the threshold similarity condition (e.g., increase the tolerance of the condition if no predetermined touch profile 212 satisfies the condition), and/or a stylus user may set user settings that adjust the tolerance of the condition.

As shown in FIG. 2, in some examples, one or more haptic outputs 216 may be associated with each touch profile 212. Touch profile 212A, for example, is associated with a haptic output 216A, such that this haptic output may be selected by stylus 100 and applied to body 101 via haptic feedback mechanism 102 based at least in part on mapping sensor data to touch profile 212A. In some examples, multiple touch profiles 212 may be associated with a common haptic output 216. As one example, touch profiles 212A and 212B are both associated with haptic output 216A. As such, stylus 100 may select and apply haptic output 216A in response to recognizing touch profile 212A and in response to recognizing touch profile 212B.

Further, in some examples, a touch profile 212 may be associated with multiple haptic outputs 216. As one example, touch profile 212N is associated with a haptic output 216B and a haptic output 216N. In some examples, one of the associated haptic outputs 216B and 216N may be selected upon recognizing touch profile 212N, where the selection is also informed by sensor data and potentially other factors such as user settings, detection of a particular activity being performed with the stylus (e.g., drawing graphical content, selecting a displayed item, hovering the stylus), and communication from a host device (e.g., computing device 104). In other examples, both haptic output 216B and haptic output 216N may be selected upon recognizing touch profile 212N, in which case a hybrid haptic output combining both haptic outputs may be applied, or both haptic outputs may be applied in succession.

Generally, user settings may be established that influence any suitable aspect of haptic output at stylus 100. For example, a user setting may stipulate that a common haptic output is to be provided for two or more touch profiles. In another example, a user setting may stipulate that different, respective haptic outputs are to be provided for each of two or more touch profiles. User settings may thus be used to control the association between touch profiles and haptic outputs. Further, user settings may stipulate aspects of haptic output as a function of the user activities being performed using stylus 100. Still further, user settings may be used to control how haptic output is provided as a function of the contact point locations between a user hand and body 101 of stylus 100.

Each haptic output 216 stored at memory 120 may include data usable to apply the haptic output to body 101. For example, each haptic output 216 may describe a corresponding waveform that when applied to haptic feedback mechanism 102 (e.g., an actuator thereof), results in the application of the haptic output to body 101. In some examples, each waveform may be specified by a predetermined amplitude and frequency. As such, applying a haptic output 216 may include driving haptic feedback mechanism 102 with a drive signal at the predetermined amplitude and frequency of the waveform corresponding to the haptic output. To this end, stylus 100 may cause a drive signal to be transmitted to haptic feedback mechanism 102 to apply a haptic output 216.

In some examples, memory 120 may store a plurality of drive signals, each of which may be associated with a respective haptic output 216. As used herein, "drive signal" refers to a waveform having an amplitude and frequency. As such, the amplitude and frequency of the drive signal transmitted to haptic feedback mechanism 102 may be respectively set to the amplitude and frequency of the waveform corresponding to the haptic output 216. In other examples, applying a haptic output 216 may include determining an amplitude and/or frequency of a waveform, such as by adjusting a predetermined amplitude and/or frequency of a default waveform. As described below, such adjustment may be carried out to achieve a substantially consistent haptic output for different touch profiles and/or user activities performed with stylus 100, or to achieve different haptic outputs for different touch profiles.

Returning briefly to FIG. 1, sensor subsystem 112 may be configured to measure aspects of a haptic output applied to body 101 (such as via an accelerometer), where the measured aspects may be used to inform the application of subsequent haptic outputs to the body. As one example, data regarding the frequency response of body 101 during the application of a haptic output may be measured and used to select or adjust the amplitude and/or frequency of a waveform. In a more particular example, a haptic output may be selected based on sensor data from sensor subsystem 112 and applied with an amplitude and frequency specified by the haptic output. Stylus 100 may then measure the frequency response of body 101 to the haptic output, and based on the measurement, adjust the amplitude of the haptic output (e.g., to achieve a closer correspondence between the actual haptic output induced in the body and the desired haptic output that was selected based on the sensor data).

In yet another example, data regarding the frequency response of body 101 may be used to compensate for variation in how a haptic output is perceived resulting from variation in the pressure applied by a user hand to stylus 100. For example, the magnitude of acceleration in body 101 resulting from the application of a haptic output may decrease as the pressure applied to stylus increases 100. This change in pressure and resulting change in acceleration in body 101 may be detected by sensor subsystem 100 and used to adjust the amplitude and/or frequency of a waveform to achieve a desired haptic output (e.g., to achieve a desired haptic output for a predetermined pressure applied to the body). Sensor subsystem 112 may produce any suitable type of data regarding the frequency response of body 101. As one example, an accelerometer system implemented by sensor subsystem 112 may produce accelerometer data relating to body 101.

Figure 3:
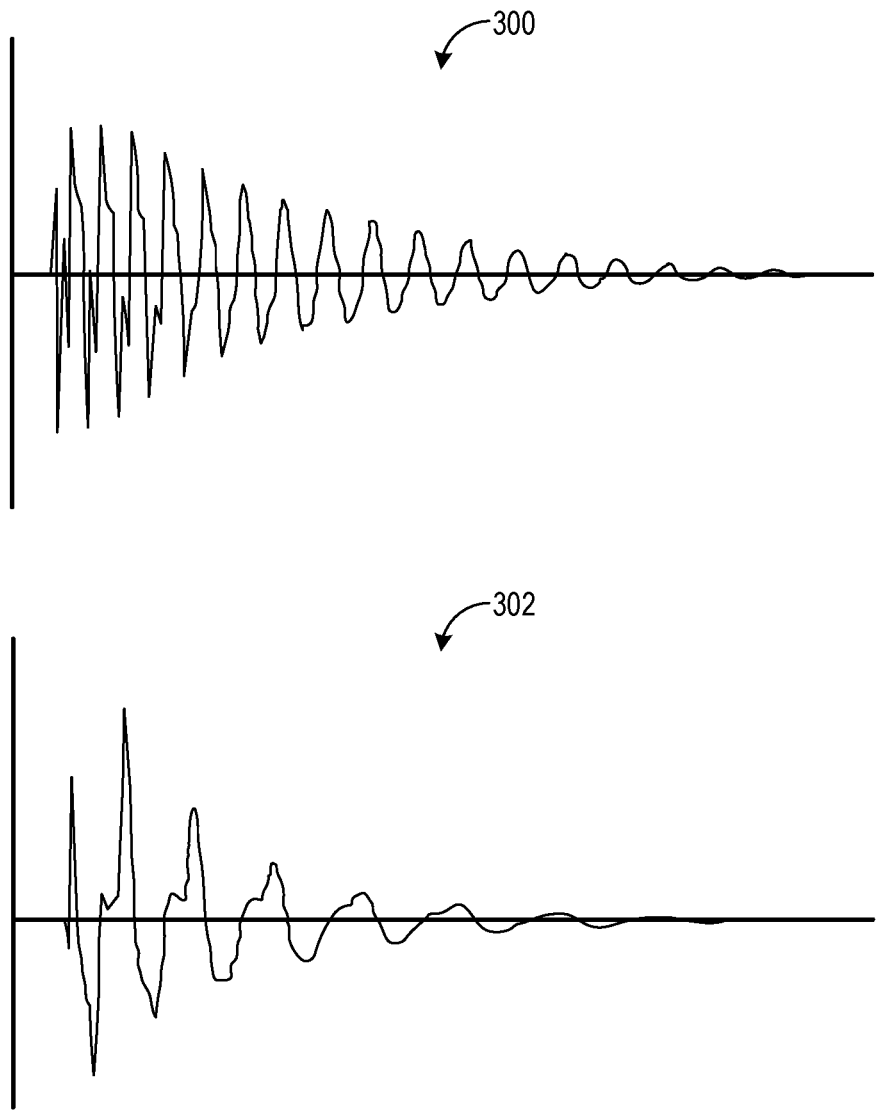
FIG. 3 depicts various example waveforms that may be used to effect different haptic outputs at the stylus of FIG. 1.
Figure 4:
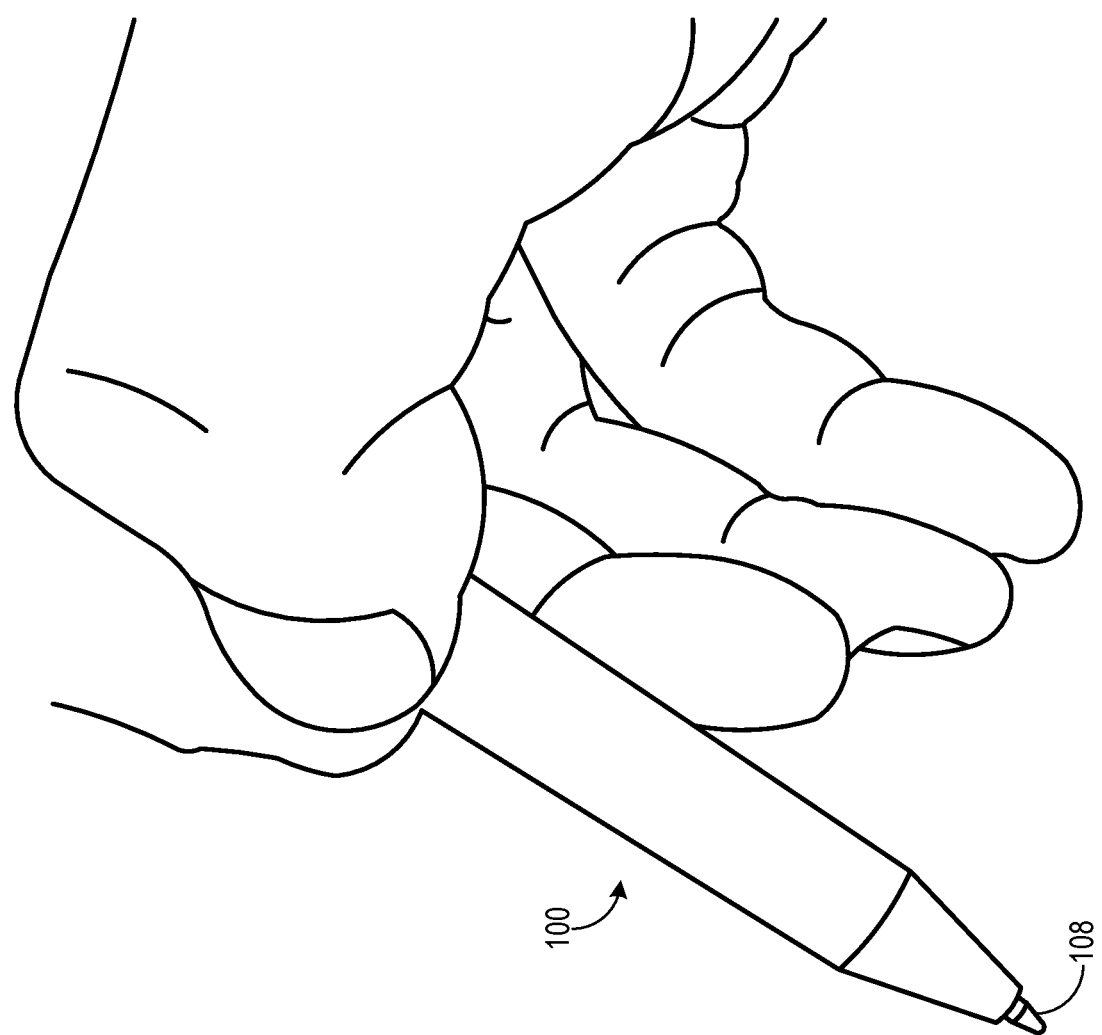
FIG. 4 depicts an example hand grip that may be applied to an input device.
Figure 5:
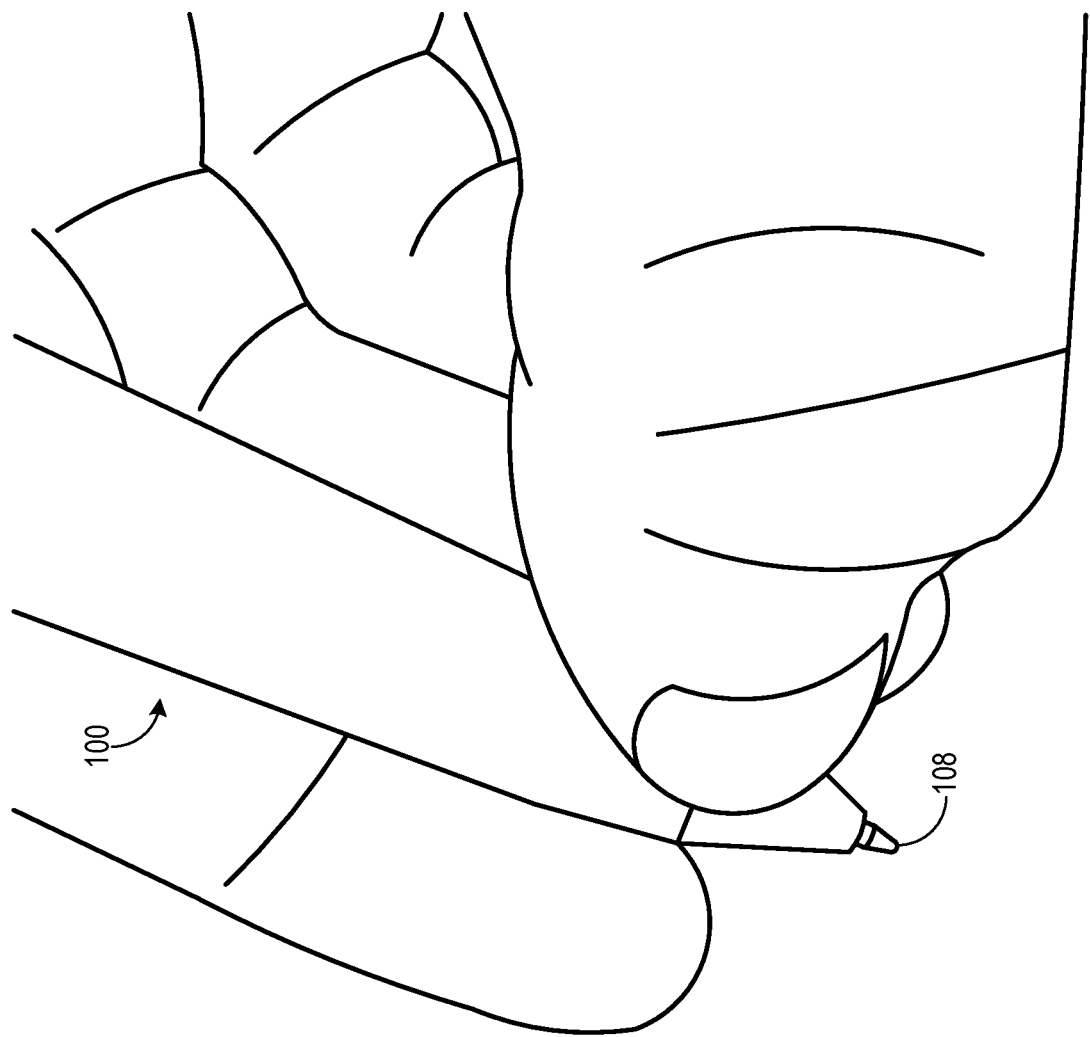
FIG. 5 depicts another example hand grip that may be applied to an input device.

FIG. 3 depicts various example waveforms that may be used to effect different haptic outputs at stylus 100. The waveforms may depict the acceleration of haptic feedback mechanism 102 (e.g., a motor thereof) as a function of time, for example. A first waveform 300 exhibiting a relatively high frequency may be used to achieve a haptic output that may be perceived as having a relatively short duration with a feeling that resembles clicking a physical button. A second waveform 302 exhibits a lower frequency relative to that of first waveform 300, and as such may be used to achieve a haptic output that may be perceived as having a longer duration with a less aggressive feel compared to those of the first waveform. For example, first waveform 300 may be applied upon detecting a touch profile corresponding to a hand grip in which stylus 100 is used as a pointing device. FIG. 4 depicts one example of such a "pointing" hand grip in which stylus 100 is used as a pointing device. As another example, second waveform 302 may be applied upon detecting a touch profile corresponding to a hand grip intended to maximize the accuracy with which input is provided by stylus 100. FIG. 5 depicts one example of such an "accuracy" hand grip in which stylus 100 is held in such a way as to maximize the precision with which stylus 100 and tip 108 are positioned.

In view of the above, the detection of different touch profiles resulting from the different grips depicted in FIGS. 4 and 5 may result in the application of different haptic outputs each selected for a respective touch profile. In such examples, stylus 100 causes a first drive signal to be transmitted to haptic feedback mechanism 102 to thereby apply a first haptic output for a first touch profile, and causes a second drive signal—different from the first drive signal—to be transmitted to the haptic feedback mechanism to thereby apply a second haptic output for a second touch profile.

In other examples, the detection of different touch profiles resulting from different grips, such as those depicted in FIGS. 4 and 5, may result in the application of substantially the same haptic output selected for each touch profile. In such examples, stylus 100 may cause a first drive signal to be transmitted to haptic feedback mechanism 102 to thereby apply a haptic output for a first touch profile, and cause a second drive signal—different from the first drive signal—to be transmitted to the haptic feedback mechanism to thereby apply the same haptic output for a second touch profile. In this way, a perceptually consistent haptic output may be achieved for significantly different touch profiles, hand grips, and user activities. To achieve a substantially common haptic output among differing touch profiles, stylus 100 may select or adjust one or more parameters of the first and/or second drive signals, which as described above may include adjusting one or more of an amplitude and a frequency. Such adjustment may be based on any suitable criteria, including but not limited to sensor data from sensor subsystem 112, contact point locations, contact point surface area, and feedback from the sensor subsystem regarding the mechanical or kinematic state of body 101.

Figure 6A:
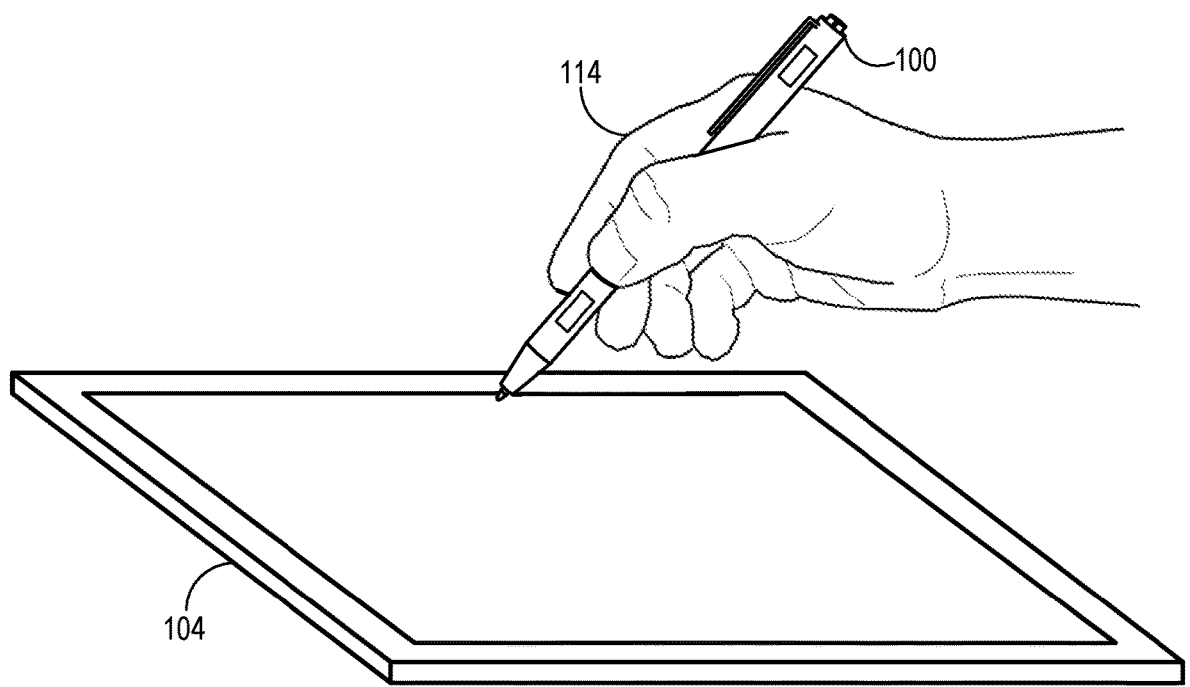
FIGS. 6A-6B illustrate different grips applied by a user hand to a stylus.
Figure 6B:
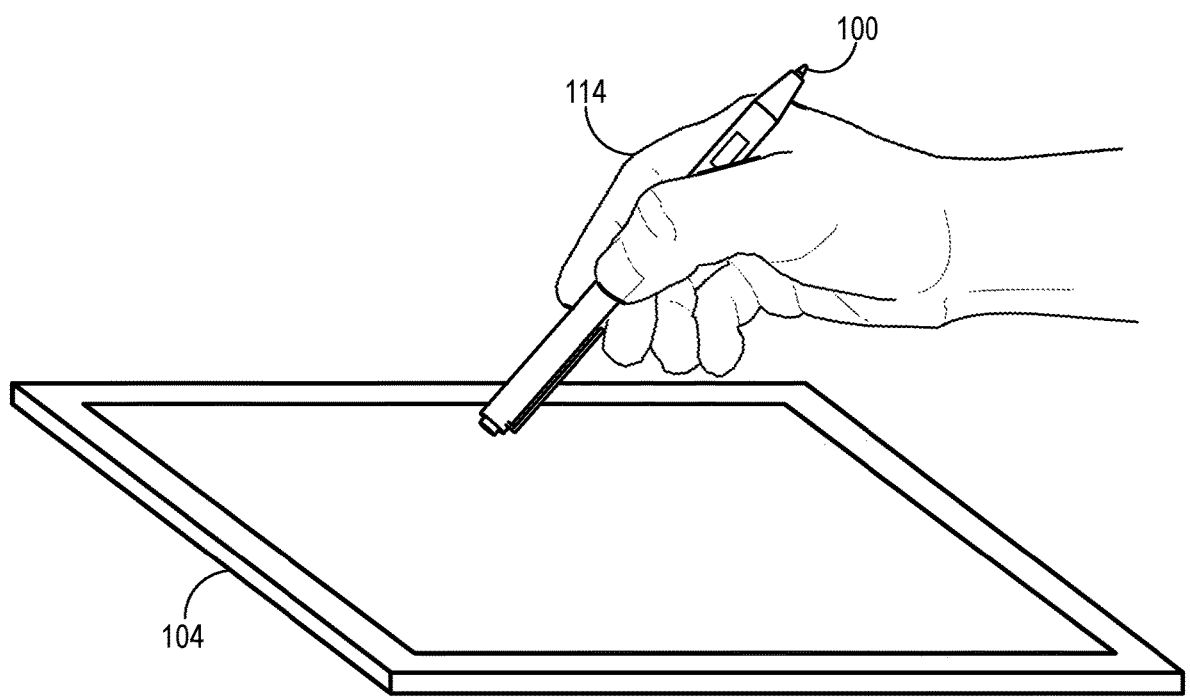

As noted above, in some examples stylus 100 may select haptic outputs to be applied to body 101 based on a user activity being performed by a user hand with the stylus. FIGS. 6A-6B illustrate respectively different grips applied by user hand 114 to stylus 100. In one example and with reference to FIG. 6A, the grip depicted therein leads to the determination of a first touch profile for which a first haptic output is selected. In this example, this first haptic output is applied to body 101 even when different user activities are performed with the stylus held in this grip. For example, this first haptic output is applied both when a first user activity and a second user activity are performed by user hand 114 with stylus 100. In this way, a perceptually consistent haptic output may be provided for different user activities. As examples, the first user activity may include drawing graphical content on touch-sensitive display 106 of computing device 104 with tip 108 of stylus 100 in contact with the touch-sensitive display, while the second user activity may include hovering the stylus a distance away from the touch-sensitive display.

In another example and with reference to FIG. 6B, the grip depicted therein leads to the determination of a second touch profile for which different haptic outputs are selected and applied to body 101 for different user activities performed with the stylus 100. For example, a first haptic output is applied when a first user activity is performed by user hand 114 holding stylus 100 in this grip. A second haptic output is selected and applied to the body when a second user activity is performed by the user hand holding the stylus 100 in this grip. As examples, the first user activity may include erasing graphical content shown on touch-sensitive display 106, while the second user activity may include hovering stylus 100 a distance away from the touch-sensitive display. In this way, haptic output may be adapted to the manner in which stylus 100 is used.

In different examples, user activities being performed using stylus 100 may be detected in any suitable manner. As examples, user activity may be detected based on one or more of sensor data from sensor subsystem 112 (e.g., contact point locations, contact point surface area), a determined touch profile, accelerometer data from a motion sensor on-board stylus 100, and the position of the stylus (e.g., relative to a host device such as computing device 104).

Figure 7A:
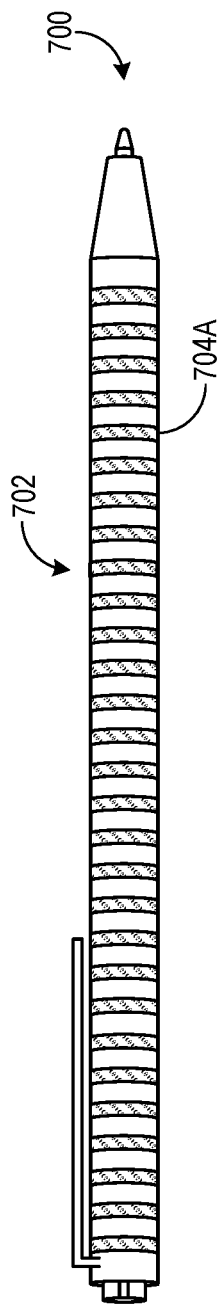
FIGS. 7A-7B depict additional example touch-sensitive input devices in the form of a stylus.
Figure 7B:
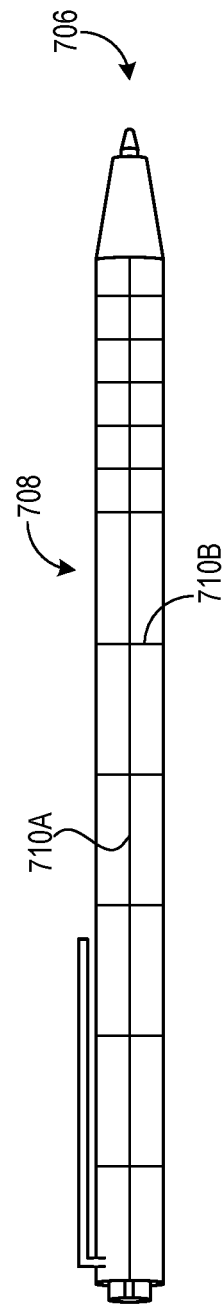

As described above, stylus 100 includes a sensor subsystem 112 configured to output sensor data indicating locations along body 101 of a plurality of contact points between a user hand and the body. Sensor subsystem 112 may be implemented in any suitable manner. As one example, FIG. 7A depicts an example stylus 700 including a sensor subsystem 702 having a plurality of annular sensing elements (e.g., element 704A) arranged along the axial length of the stylus and extending circumferentially around the stylus. FIG. 7B depicts another example stylus 706 including a sensor subsystem 708 having a sensing element 710A arranged along the axial length of the stylus and a plurality of sensing elements (e.g., element 710B) extending circumferentially around the stylus. In this example, the density of sensing elements 710 varies at different locations along stylus 100, with a higher density of elements toward the tip of the stylus as compared to the density of elements toward the eraser end of the stylus. The location at which the higher density elements are provided may correspond to a location at which contact by user hands tends to occur more frequently than other locations, for example.

Sensing elements 704 and 710 may assume any suitable form. For example, sensing elements 704 and 710 may sense contact at stylus 100 capacitively. In such examples, sensing elements 704 and 710 may be driven by drive circuitry and coupled to receive circuitry configured to produce an output (e.g., voltage, current) indicative of the presence or absence of contact. More generally, the sensor subsystems described herein may detect contact along any suitable extent of the exterior surface of an input device. In some examples, a sensor subsystem may detect the locations of contact points that are distributed axially and circumferentially along the body of an input device. For other input devices, such as those with non-cylindrical profiles, a sensor subsystem may detect the locations of contact points that are distributed axially and along the perimeter of the body of an input device.

Figure 8:
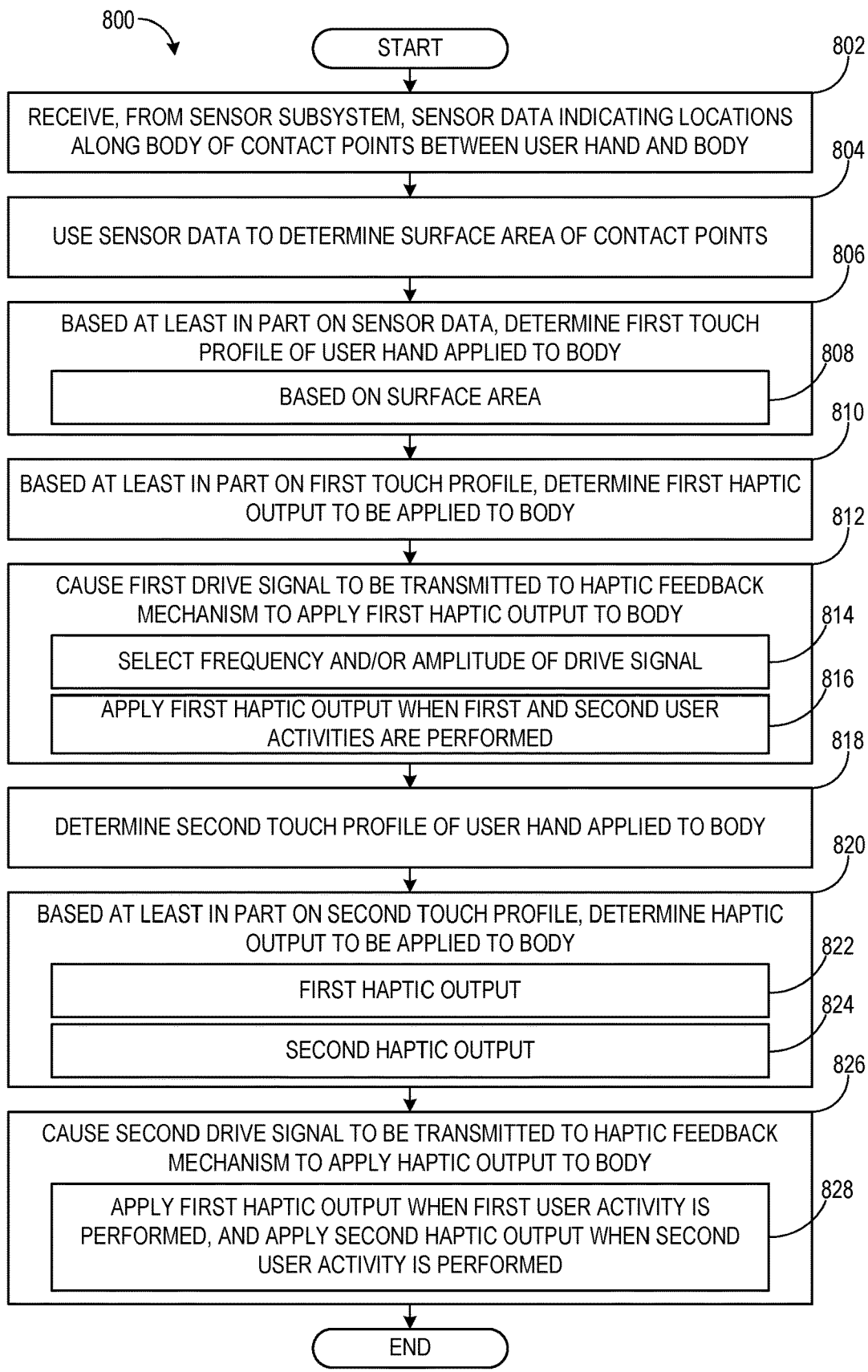
FIG. 8 depicts a flowchart illustrating a method for providing haptic output to a touch-sensitive input device.

FIG. 8 depicts a flowchart illustrating a method 800 for providing haptic output to a touch-sensitive input device. Method 800 may be implemented at one or more of styluses 100, 700, and 706, for example. The following description of method 800 is provided by way of example and is not meant to be limiting. Therefore, it is to be understood that method 800 may include additional and/or alternative steps relative to those illustrated in FIG. 8. Further, it is to be understood that the steps of method 800 may be performed in any suitable order. Further still, it is to be understood that one or more steps may be omitted from method 800 without departing from the scope of this disclosure. It will also be appreciated that method 800 also may be performed in other contexts using other suitable components.

At 802, method 800 includes receiving, from a sensor subsystem of the input device, sensor data indicating locations along a body of the input device of a plurality of contact points between a user hand and the body. At 804, method 800 includes using the sensor data to determine a surface area of the plurality of contact points between the user hand and the body. At 806, method 800 includes, based at least in part on the sensor data, determining a touch profile of the user hand applied to the body. The touch profile may be determined based further at least in part on the surface area 808 determined at 804. As described above, determining the touch profile may include mapping the sensor data to a most closely corresponding touch profile among a plurality of predetermined touch profiles stored at the input device, and potentially based on a threshold similarity condition.

At 810, method 800 includes, based at least in part on the touch profile of the user hand, determining a selected haptic output to be applied to the body. As described above, the selected haptic output may be a haptic output associated with the touch profile. At 812, method 800 includes causing a drive signal to be transmitted to a haptic feedback mechanism within the body to apply the selected haptic output to the body. Applying the haptic output may include selecting 814 at least one characteristic of the drive signal selected from the frequency and/or amplitude of the drive signal. As described above, the frequency and/or amplitude of the drive signal may be specified by a waveform associated with the selected haptic output. Thus, in some examples, the frequency and/or amplitude of the drive signal may be selected as the frequency and/or amplitude specified by the waveform, respectively. In other examples, selecting the frequency and/or amplitude may include adjusting one or both of a predetermined frequency and amplitude (e.g., based on a feedback signal from the sensor subsystem indicating acceleration of the input device body). Further, at 816 applying the haptic output may include applying a first haptic output both when first and second user activities are performed using the input device.

At 818, method 800 includes determining a second touch profile of a user hand applied to the input device body different from the first touch profile. At 820, method 800 includes, based at least in part on the second touch profile of the user hand, determining a selected haptic output to be applied to the body. At 822 the selected haptic output may include the first haptic output determined at 810. Alternatively or additionally, at 824 the selected haptic output may include a second haptic output different from the first haptic output. At 826, method 800 includes causing a second drive signal different from the first drive signal to be transmitted to the haptic feedback mechanism to apply the selected haptic output determined at 818 to the body. At 828, applying the selected haptic output may include applying the first haptic output when a first user activity is performed by a user hand with the input device, and applying the second haptic output when a second user activity is performed by a user hand with the input device.

The approaches described herein may enable an input device to provide haptic output that adapts to the sensed contact between user hands and the input device. As such, in some examples a perceptually consistent haptic output may be experienced by a user gripping the input device with varying finger positions, finger pressures, and hand grips. In other examples, the approaches described herein may also enable the provision of different haptic outputs that adapt to the contact made between user hands and an input device and/or the user activity being performed with the input device. These and other aspects of the disclosed approaches may enable a greater range of haptic outputs, an increased ability to adapt haptic outputs to different use contexts, and more accurate haptic outputs. This improvement in haptic output may provide more useful and/or accurate feedback to input device users, and potentially support adaptive user interaction with the input device and a host device (e.g., for differently abled users).

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
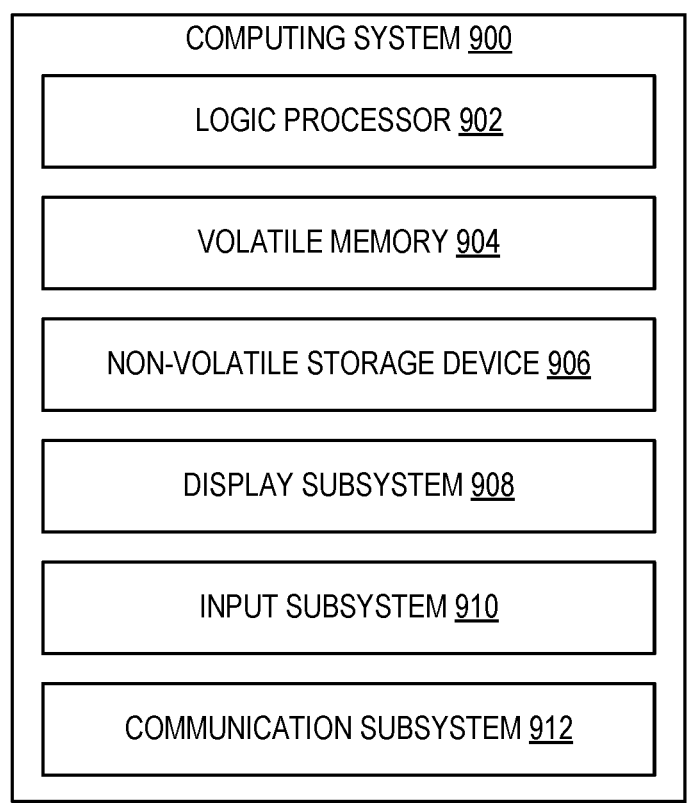
FIG. 9 schematically depicts an example computing system.

FIG. 9 schematically shows a non-limiting embodiment of a computing system 900 that can enact one or more of the methods and processes described above. Computing system 900 is shown in simplified form. Computing system 900 may embody the computer device 10 described above and illustrated in FIG. 2. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices. One or more aspects of computing system 900 may be utilized in stylus 100, stylus 700 and stylus 706.

Computing system 900 includes a logic processor 902, volatile memory 904, and a non-volatile storage device 906. Computing system 900 may optionally include a display subsystem 908, input sub system 910, communication sub system 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

Another example provides a method for providing haptic output to a touch-sensitive input device, the method comprising receiving, from a sensor subsystem of the input device, sensor data indicating locations along a body of the input device of a plurality of contact points between a user hand and the body, based at least in part on the sensor data, determining a touch profile of the user hand applied to the body, based at least in part on the touch profile of the user hand, determining a selected haptic output to be applied to the body, and causing a drive signal to be transmitted to a haptic feedback mechanism within the body to apply the selected haptic output to the body. In such an example, the method may further comprise using the sensor data to determine a surface area of the plurality of contact points between the user hand and the body, and determining the touch profile of the user hand based at least in part on the surface area. In such an example, the touch profile may be a first touch profile and the drive signal may be a first drive signal, and the method alternatively or additionally may comprise determining a second touch profile of the user hand applied to the body different from the first touch profile, based at least in part on the second touch profile of the user hand, determining the selected haptic output to be applied to the body, and causing a second drive signal different from the first drive signal to be transmitted to the haptic feedback mechanism to apply the selected haptic output to the body. In such an example, the touch profile may be a first touch profile, the selected haptic output may be a first selected haptic output, and the drive signal may be a first drive signal, and the method alternatively or additionally may comprise determining a second touch profile of the user hand applied to the body different from the first touch profile, based at least in part on the second touch profile of the user hand, determining a second selected haptic output different from the first selected haptic output to be applied to the body, and causing a second drive signal different from the first drive signal to be transmitted to the haptic feedback mechanism to apply the second selected haptic output to the body. In such an example, the touch profile may be one of a plurality of touch profiles, and each of the plurality of touch profiles may be associated with a respective selected haptic output. In such an example, the drive signal may be one of a plurality of drive signals, and each of the plurality of drive signals may be associated with a respective selected haptic output. In such an example, causing the drive signal to be transmitted to the haptic feedback mechanism may comprise selecting at least one characteristic of the drive signal selected from frequency and amplitude. In such an example, the touch profile may be a first touch profile and the selected haptic output may be a first selected haptic output, and the method alternatively or additionally may comprise, in response to determining the first touch profile, applying the first selected haptic output to the body when a first user activity is performed by the user hand with the input device and when a second user activity is performed by the user hand with the input device, and, in response to determining a second touch profile of the user hand applied to the body, applying the first selected haptic output to the body when the first user activity is performed by the user hand with the input device, and applying a second selected haptic output to the body when the second user activity is performed by the user hand with the input device.

Another example provides a touch-sensitive input device, comprising a body, a haptic feedback mechanism within the body, a sensor subsystem, a logic processor, and a memory storing instructions executable by the processor to provide haptic output via the haptic feedback mechanism, the instructions executable to carry out the method of any preceding example. In such an example, the locations of the plurality of contact points between the user hand and the body may be distributed axially and circumferentially along the body.

Another example provides a computer program which when executed on a processor of a touch sensitive input device is configured to carry out the method of any one of the preceding examples.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The phrase "at least one of," when used with a list of items, means different combinations of zero, one or more of the listed items can be used. In other words, "at least one of" means any combination of items and number of items may be used from the list, but not all of the items in the list are required. In one example, "at least one of item X, item Y, and item Z" may include item X; item Y; item Z; items X and Y; items Y and Z; or items X, Y, and Z. Any numbers and combinations of these items can be present. In some examples, "at least one of" can be, for example, three of item X; four of item X and one of item Y; two of item X and six of item Z; or other such combinations.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for providing haptic output to a touch-sensitive input device, the method comprising:
    receiving, from a sensor subsystem of the input device, sensor data indicating locations along a body of the input device of a plurality of contact points between a user hand and the body;
    based at least in part on the sensor data, determining a touch profile of the user hand applied to the body;
    based at least in part on the touch profile of the user hand, determining a selected haptic output to be applied to the body;
    causing a drive signal to be transmitted to a haptic feedback mechanism within the body to cause the haptic feedback mechanism to apply the selected haptic output to the body, wherein the drive signal has an amplitude and a frequency determined by the selected haptic output;
    measuring, using the sensor subsystem, a pressure applied by the user hand to the body and a frequency response of the body to the selected haptic output applied to the body by the haptic feedback mechanism; and
    based at least on the frequency response measurement and the pressure measurement, adjusting at least one of the amplitude and the frequency of the drive signal.

2. The method of claim 1, further comprising:
    using the sensor data to determine a surface area of the plurality of contact points between the user hand and the body; and
    determining the touch profile of the user hand based at least in part on the surface area.

3. The method of claim 1, wherein the touch profile is a first touch profile and the drive signal is a first drive signal, the method further comprising:
    determining a second touch profile of the user hand applied to the body different from the first touch profile;
    based at least in part on the second touch profile of the user hand, determining the selected haptic output to be applied to the body; and
    causing a second drive signal different from the first drive signal to be transmitted to the haptic feedback mechanism to apply the selected haptic output to the body.

4. The method of claim 1, wherein the touch profile is a first touch profile, the selected haptic output is a first selected haptic output, and the drive signal is a first drive signal, the method further comprising:
    determining a second touch profile of the user hand applied to the body different from the first touch profile;
    based at least in part on the second touch profile of the user hand, determining a second selected haptic output different from the first selected haptic output to be applied to the body; and
    causing a second drive signal different from the first drive signal to be transmitted to the haptic feedback mechanism to apply the second selected haptic output to the body.

5. The method of claim 1, wherein the touch profile is one of a plurality of touch profiles, and wherein each of the plurality of touch profiles is associated with a respective selected haptic output.

6. The method of claim 1, wherein the drive signal is one of a plurality of drive signals, and wherein each of the plurality of drive signals is associated with a respective selected haptic output.

7. The method of claim 1, wherein the touch profile is a first touch profile and the selected haptic output is a first selected haptic output, the method further comprising:
    in response to determining the first touch profile, applying the first selected haptic output to the body when a first user activity is performed by the user hand with the input device and when a second user activity is performed by the user hand with the input device; and
    in response to determining a second touch profile of the user hand applied to the body, applying the first selected haptic output to the body when the first user activity is performed by the user hand with the input device, and applying a second selected haptic output to the body when the second user activity is performed by the user hand with the input device.

8. A touch-sensitive input device, comprising:
    a body;
    a haptic feedback mechanism within the body;
    a sensor subsystem;
    a logic processor; and
    a memory storing instructions executable by the processor to:
        receive, from the sensor subsystem of the input device, sensor data indicating locations along the body of the input device of a plurality of contact points between a user hand and the body;
        based at least in part on the sensor data, determine a touch profile of the user hand applied to the body;
        based at least in part on the touch profile of the user hand, determine a selected haptic output to be applied to the body;
        cause a drive signal to be transmitted to the haptic feedback mechanism within the body to cause the haptic feedback mechanism to apply the selected haptic output to the body, wherein the drive signal has an amplitude and a frequency determined by the selected haptic output;
        measure, using the sensor subsystem, a pressure applied by the user hand to the body and a frequency response of the body to the selected haptic output applied to the body by the haptic feedback mechanism; and
        based at least on the frequency response measurement and the pressure measurement, adjust at least one of the amplitude and the frequency of the drive signal.

9. The touch-sensitive input device of claim 8, wherein the locations of the plurality of contact points between the user hand and the body are distributed axially and circumferentially along the body.

10. The touch-sensitive input device of claim 8, wherein the instructions are executable to:
    use the sensor data to determine a surface area of the plurality of contact points between the user hand and the body; and determine the touch profile of the user hand based at least in part on the surface area.

11. The touch-sensitive input device of claim 8, wherein the touch profile is a first touch profile and the drive signal is a first drive signal, and the instructions are executable to:
   determine a second touch profile of the user hand applied to the body different from the first touch profile;
   based at least in part on the second touch profile of the user hand, determine the selected haptic output to be applied to the body; and
   cause a second drive signal different from the first drive signal to be transmitted to the haptic feedback mechanism to apply the selected haptic output to the body.

12. The touch-sensitive input device of claim 8, wherein the touch profile is a first touch profile, the selected haptic output is a first selected haptic output, and the drive signal is a first drive signal, and the instructions are executable to:
   determine a second touch profile of the user hand applied to the body different from the first touch profile;
   based at least in part on the second touch profile of the user hand, determine a second selected haptic output different from the first selected haptic output to be applied to the body; and
   cause a second drive signal different from the first drive signal to be transmitted to the haptic feedback mechanism to apply the second selected haptic output to the body.

13. The touch-sensitive input device of claim 8, wherein the touch profile is one of a plurality of touch profiles, and wherein each of the plurality of touch profiles is associated with a respective selected haptic output.

14. The touch-sensitive input device of claim 8, wherein the drive signal is one of a plurality of drive signals, and wherein each of the plurality of drive signals is associated with a respective selected haptic output.

15. The touch-sensitive input device of claim 8, wherein the touch-sensitive input device is a stylus.

16. The method of claim 1, wherein the touch-sensitive input device is a stylus.

17. A touch-sensitive stylus, comprising:
   a body;
   a haptic feedback mechanism within the body;
   a sensor subsystem;
   a logic processor; and
   a memory storing instructions executable to:
      receive, from the sensor subsystem of the input device, sensor data indicating locations along the body of the input device of a plurality of contact points between a user hand and the body;
      based at least in part on the sensor data, determine a touch profile of the user hand applied to the body, wherein the touch profile comprises a data structure encoding at least one spatial relationship between the body and the contact points between the user hand and the body;
      based at least in part on the touch profile of the user hand, determine a selected haptic output to be applied to the body;
      cause a drive signal to be transmitted to the haptic feedback mechanism within the body to cause the haptic feedback mechanism to apply the selected haptic output to the body, wherein the drive signal has an amplitude and a frequency determined by the selected haptic output;
      measure, using the sensor subsystem, a pressure applied by the user hand to the body and a frequency response of the body to the selected haptic output applied to the body by the haptic feedback mechanism; and
      based at least on the frequency response measurement and the pressure measurement, adjust at least one of the amplitude and the frequency of the drive signal.

18. The stylus of claim 17, wherein the at least one spatial relationship between the body and the contact points between the user hand and the body comprises a surface area of the contact points.

19. The stylus of claim 17, wherein the at least one spatial relationship between the body and the contact points between the user hand and the body comprises spatial distribution of the contact points over the body.

20. The stylus of claim 17, wherein the locations of the plurality of contact points between the user hand and the body are distributed axially and circumferentially along the body.

* * * * *